Aug. 17, 1937.  F. AHLBURG  2,089,936
FRUIT COUNTER
Filed March 15, 1932  2 Sheets-Sheet 1
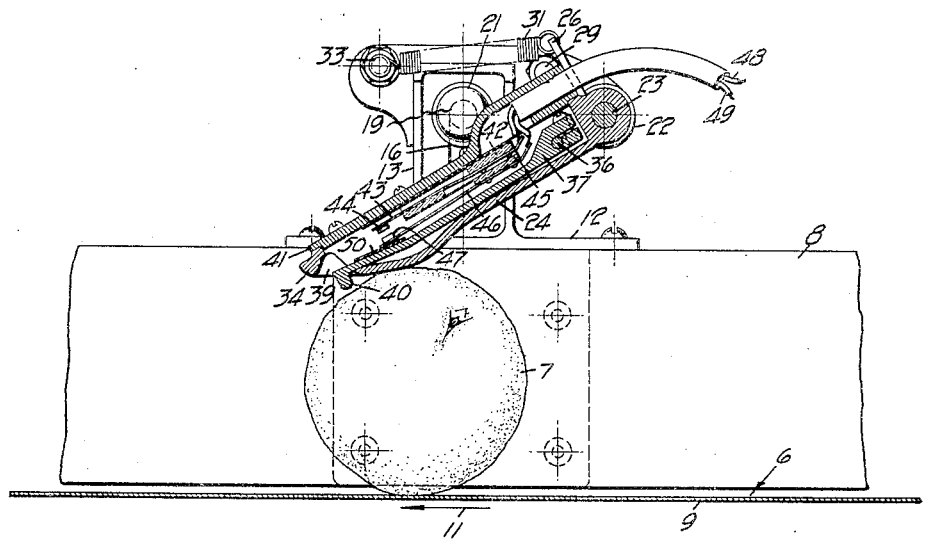
FIG_1_
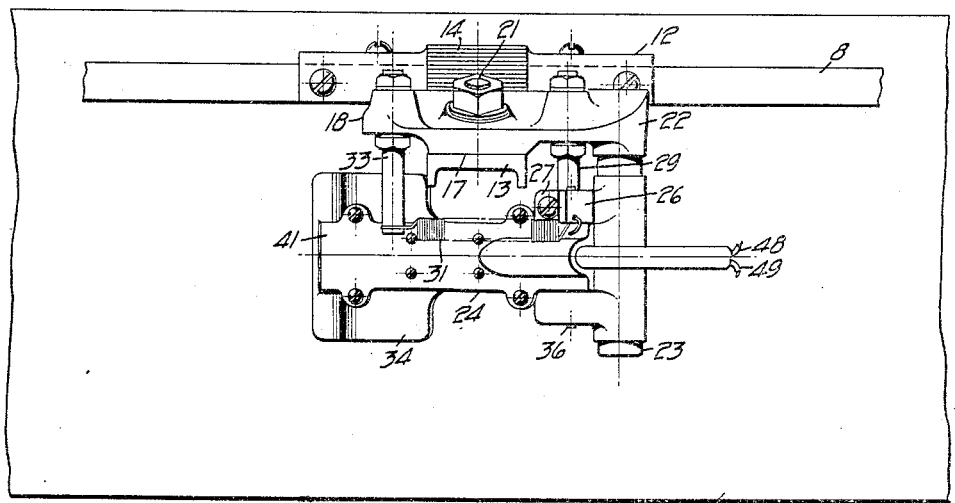
FIG_2_
INVENTOR.
FRANK AHLBURG
BY
ATTORNEYS.

Aug. 17, 1937.  F. AHLBURG  2,089,936
FRUIT COUNTER
Filed March 15, 1932   2 Sheets-Sheet 2
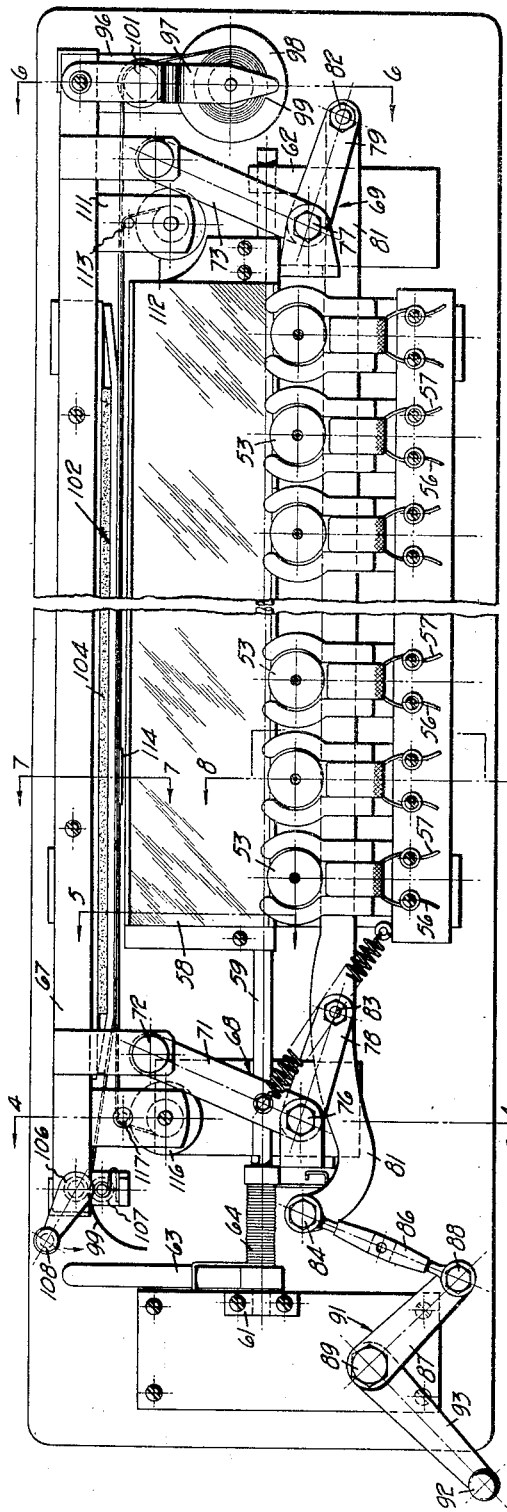
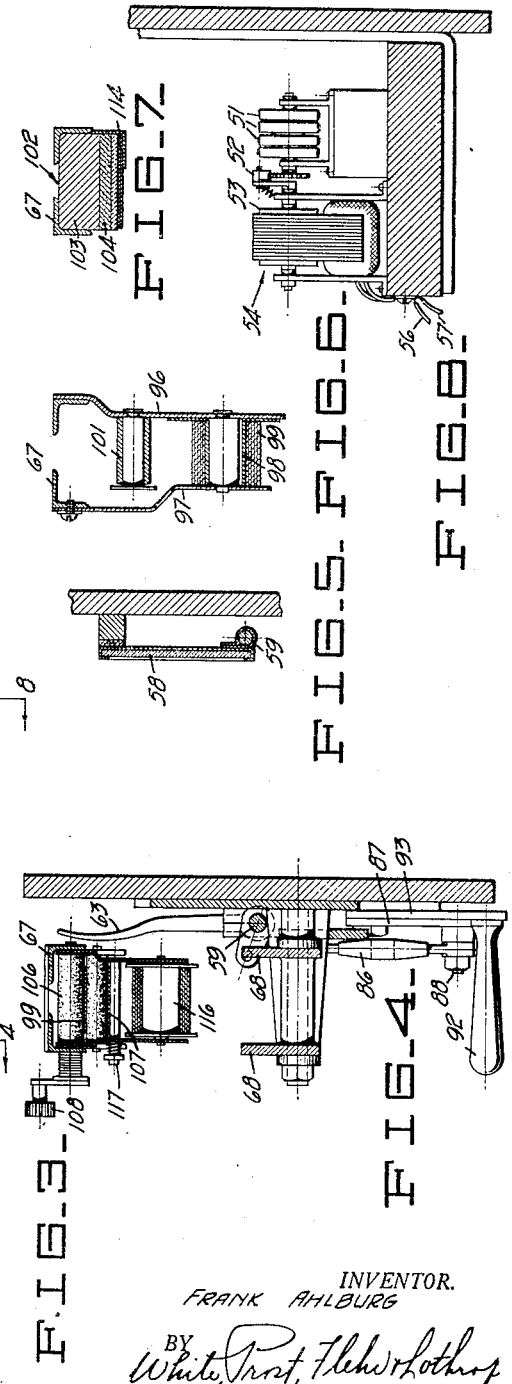
INVENTOR.
FRANK AHLBURG
BY White, Prost, Fleher Lothrop
ATTORNEYS.

Patented Aug. 17, 1937

2,089,936

UNITED STATES PATENT OFFICE 2,089,936

FRUIT COUNTER

Frank Ahlburg, Los Angeles, Calif.

Application March 15, 1932, Serial No. 598,973

2 Claims. (Cl. 235—98)

My invention relates to means for counting the number of fruit passing a given point.

An object of my invention is to provide a fruit counter which is very rapid in operation but nevertheless is accurate.

Another object of my invention is to provide a fruit counter especially for use in packing houses which can easily be installed without altering the present equipment.

Another object of my invention is to provide a fruit counter which affords a printed record of the fruit counted.

A further object of my invention is to provide a fruit counter which will give an indication at a central point of the number of fruit counted in various different locations.

The foregoing and other objects are attained in the embodiment of the invention shown in the drawings, in which Figure 1 is a cross section on a vertical longitudinal plane of the contact unit of my fruit counter.

Figure 2 is a plan of the unit shown in Figure 1.

Figure 3 is a plan of the recording unit of my fruit counter, certain portions being removed to increase the clarity of the disclosure.

Figure 4 is a cross section, the plane of which is indicated by the lines 4—4 of Figure 3.

Figure 5 is a cross section, the plane of which is indicated by the lines 5—5 of Figure 3.

Figure 6 is a cross section, the plane of which is indicated by the lines 6—6 of Figure 3.

Figure 7 is a cross section, the plane of which is indicated by the lines 7—7 of Figure 3.

Figure 8 is a cross section, the plane of which is indicated by the lines 8—8 of Figure 3.

In its preferred form, the fruit counter of my invention includes a contact unit having an arm adapted to ride over fruit advancing in a predetermined path and on which is mounted a finger for actuating contacts in an electrical circuit upon engagement with a fruit, together with a recording unit provided with one or more printing units individually actuated by electrical impulses from one or more of the contact units and having means for simultaneously taking on a strip of paper impressions from all of the printing units.

Since the fruit counter of my invention finds a suitable environment in an orange packing house of the customary type, it will be described in such environment, although it can easily be utilized in various different environments. It is customary in an orange packing house to provide a runway 6 for the oranges 7 by means of a confining wall 8 and an incline or traveling belt 9 for advancing the fruit in a predetermined direction, indicated in the drawings by the arrow 11. Since it is desired to count the number of oranges, for instance, passing a given point, I preferably mount on the side wall 8, for instance, a support 12, which comprises a plate suitably fastened to the side wall and provided at its upper end with an extension 13 having a serrated face 14 and a longitudinal slot 16. Mating with the serrations on the extension 13 are serrations 17 on a block 18 provided with a central aperture 19. A bolt 21 passes through the aperture 19 and the slot 16 so that the plate 12 and the block 18 are adjustably related.

Passing through a boss 22 on the block 18 is a stationary pivot pin 23, the axis of which is at right angles to the direction of advance 11 of the fruit 7. Carried by the pin 23 is an arm 24 designed to swing freely about the axis of the pin between limits established by stops 26 and 27 formed by the arms of an angle 28 encompassing a stationary pin 29 projecting from the block 18. A coil spring 31 fastened to the stop 26 and to a stationary pin 33 on the block 18 supplements the force of gravity in urging the arm 24 towards the fruit 7.

The arm 24 at its free end is enlarged to provide a pad 34 which comes into engagement with the surface of the fruit 7 passing on the belt 9. The pad 34 therefore rises and falls in engagement with the various individual pieces of fruit as they pass but affords insufficient resistance to retard the fruit materially. Carried by a pin 36 passing through the arm 24 is a finger 37 which lies within the hollow central portion 38 of the arm and at its free end passes through an aperture 39 in the pad 34. The lower end of the finger 37 is transversely enlarged to provide a bar 40. By this means, the finger 37 is pivotally mounted on the arm 24 to swing about an axis which is at right angles to the direction of advance and which is parallel to the axis of the pin 23.

In order that relative movement between the finger 37 and the arm 24 will be productive of an impulse suitable for counting purposes, I preferably mount on the cover 41 of the arm 24 an insulating block 42 to which is secured a leaf spring 43 carrying at its free end an electrical contact 44. On the opposite side of a spacing insulating block 45 is mounted a similar leaf spring 46 at its free end carrying an electrical contact 47. The leaf springs 43 and 46 are connected by leads 48 and 49 in a suitable electrical circuit, more fully described later.

As the finger 37 is rotated with respect to the arm 24 by engagement of the bar 40 with a fruit 7 passing thereunder, an insulating cam 50 on the finger 37 rises and abuts the spring arm 46 to close the contacts 44 and 47, thereby completing a circuit through the leads 48 and 49. Inasmuch as the requisite movement of the finger 37 to close the contacts is relatively slight, very rapid actuation is possible. This rapid actuation is caused by the bulge formed on the fruit engaging wall of the arm 24. When the fruit first contacts the arm 24, the arm is lifted rapidly until the fruit rolls into contact with the lower surface of the bulged portion. Thereafter little, if any, further raising of the arm occurs until a count has been made by raising the bar 40 relative to the arm 24. Thus, with the arm bulged in this manner, there is less likelihood of the arm 24 being out of contact with the fruit at the time the count is made. Furthermore, since the arm 24 always follows the upper contour of the fruit advancing along the belt 9, the bar 39 is always in a position to engage the fruit despite variations in size and contour of the fruit so that contact is easily and quickly made and broken.

In order to receive the impulses from the electrical circuit and in order to provide a printed record of the operation of one or more of the described contact units, I provide a printing unit as shown generally in Figure 3. In this arrangement, for each of the contact units in a given installation, there is provided a type wheel unit 51, preferably any standard kind of printing counter. Each of the type wheel units 51 is arranged with its printing face coplanar with the printing faces of the remainder of the type wheel units. Each unit is preferably driven by a ratchet mechanism 52 which is unidirectionally effective once for each oscillation of the armature 53 of a motor 54, associated with the printing wheels and connected by leads 56 and 57 to the leads 48 and 49 from the contact device. For each closure of the contacts in the contact device, the armature 53 is oscillated and the printing unit 51 is advanced one step to indicate one counting operation.

So that the type wheels can easily be read at any time, I preferably mount a mirror 58 on a rotatable rod 59 carried in suitable journal blocks 61 and 62 on the mounting of the printing unit. The rod 59 likewise is provided with a handle 63 which is connected to a coil spring 64 in such a fashion that the mirror 58 customarily is held in upright position, but by inclining the handle 63 forwardly at approximately 45°, the type wheels 51 can easily be read.

In addition to the visual impression of the type wheels afforded by the mirror 58, I provide means for obtaining a printed impression from the type wheels. To this end, there is provided a platen frame 67, which is carried on two pairs of bell cranks 68 and 69 respectively. One arm 71 of the bell crank 68 is pivoted by a pin 72 to the frame 67 while an arm 73 of the bell crank 69 is pivoted by a pin 74 to the frame 67. The bell cranks in turn are respectively pivoted as at 76 and 77 so that when they are simultaneously pivoted the platen frame 67 moves with a parallel motion into juxtaposition with the type wheels 51.

For moving the bell cranks 68, I preferably secure to the arms 78 and 79 thereof a longitudinal actuating bar 81 which is pivotally connected as at 82 to the arm 79 and as at 83 to the arm 78. Also connected to the actuating bar by a pivot 84 is a connecting link 86 joined to a bell crank 91 having an arm 87. The pivot 88 connects these two members while a pivot 89 locates the bell crank. A convenient operating handle 92 is provided on the other arm 93 of the bell crank 92. The arrangement is such that when the handle 92 is raised, the link 86 moves the connecting member 81 in such a fashion that both bell cranks 78 and 79 are rotated simultaneously, and the linkage is furthermore such that the pivots 88, 89 and 84 come into direct alignment and pass alignment so that there is a toggle action in forcing the platen frame 67 toward the type wheels.

To carry suitable means for receiving the printed impression, the platen frame 67 at one end is provided with a pair of depending members 96 and 97 forming support for a paper spool 98 carrying a strip of paper 99 and for a guide roller 101. The member 97 is flexible so that it can be dislodged in order to remove or replace a spool 98. From the guide roller 101 the strip of paper 99 passes over in immediate contact with a platen 102 fastened to the platen frame 67 and preferably including not only a relatively rigid block 103, but likewise a cushion member 104 of sponge rubber, for instance. The paper is held in contact with the platen 102 by passing between a pair of rollers 106 and 107 suitably journaled at the opposite end of the platen frame 67. The roller 106 is provided with a hand crank 108 so that the paper 99 can be advanced over the platen as desired.

There is likewise provided on the platen frame 67 a pair of extensions 111 which support a ribbon roll 112. From the ribbon roll, the ribbon passes over a guide rod 113 and overlies the strip of paper 99. A guide finger 114 fastened to the platen frame 67 assists in retaining the ribbon 112 and the paper 99 in position. The other end of the ribbon is wound upon a roll 116 after passing over a guide rod 117.

In the operation of the printing unit, the handle 92 is actuated whenever desired, bringing the platen frame together with the ribbon and paper mechanism mounted thereon into contact with the printing units to receive an impression. Upon return of the handle 92, the handle 108 can be rotated, winding between the rolls 106 and 107 the length or strip of paper upon which the imprint or record has been made, which can then be detached from the machine.

It is to be understood that I do not limit myself to the form of the fruit counter shown and described herein, as the invention, as set forth in the following claims may be embodied in a plurality of forms.

I claim:—

1. In a fruit counter, a support adapted to be disposed adjacent the path of advancing fruit, a paddle-shaped arm overlying the path of fruit and adapted to be normally disposed in an inclined position, a pivotal connection between the upper end of said arm and said support, whereby said arm may swing upwardly relative to the support about a horizontal axis, said arm including a lower fruit engaging wall which is of substantial width near the free end of the arm, a lever having its one end fulcrumed to the arm at a point near said pivotal axis and extending above said bottom wall to a point near the free end of the arm, a fruit engaging bar secured to that end of the lever near the free end of the arm, the bottom wall of the arm near the free end of the same having a slot to accommodate said bar, said bar extending in a direction substantially parallel to said pivotal axis and being movable by fruit from a projected position in which it extends below the lower surface of the arm, to a retracted position within said slot, and electrical contacts carried by said arm and adapted to be opened and closed by movements of said bar.

2. In a fruit counter, a support adapted to be disposed adjacent the path of advancing fruit, a paddle-shaped arm overlying the path of fruit and adapted to be normally disposed in an inclined position, a pivotal connection between the upper end of said arm and said support, whereby said arm may swing upwardly relative to the support about a horizontal axis, said arm including a lower fruit engaging wall which is of substantial width near the free end of the arm, a lever having its one end fulcrumed to the arm at a point near said pivotal axis and extending above said bottom wall to a point near the free end of the arm, a fruit engaging bar secured to that end of the lever near the free end of the arm, the bottom wall of the arm near the free end of the same having a slot to accommodate said bar, said bar extending in a direction substantially parallel to said pivotal axis and being movable by fruit from a projected position in which it extends below the lower surface of the arm, to a retracted position within said slot, and electrical contacts carried by said arm and adapted to be opened and closed by movements of said bar, a portion of said bottom wall, adjacent said slot and between the slot and said pivotal axis, being bulged downwardly.

FRANK AHLBURG.